United States Patent
Kim et al.

(10) Patent No.: US 7,710,924 B2
(45) Date of Patent: May 4, 2010

(54) METHOD OF SUPPORTING MEDIA INDEPENDENT HANDOVER WITH RESOURCE MANAGEMENT FUNCTION IN A MOBILE COMMUNICATION SYSTEM

(75) Inventors: Yong-Ho Kim, Bucheon (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 972 days.

(21) Appl. No.: 11/428,790

(22) Filed: Jul. 5, 2006

(65) Prior Publication Data

US 2007/0025294 A1      Feb. 1, 2007

(30) Foreign Application Priority Data

Jul. 5, 2005     (KR) ...................... 10-2005-0060186

(51) Int. Cl.
    *G06F 15/16*      (2006.01)
(52) U.S. Cl. ...................... 370/331; 370/401
(58) Field of Classification Search ................ 370/331, 370/338, 401, 469; 455/436, 442
    See application file for complete search history.

(56) References Cited

U.S. PATENT DOCUMENTS 6,591,103 B1 *   7/2003   Dunn et al. .................. 455/436

2003/0125027 A1   7/2003   Gwon et al.

OTHER PUBLICATIONS

Kaulgud V.S.; Mondal S.A.; "Exploiting multihoming for low latency handoff in heterogeneous network." Proceedings of the 8th International Conference on Telecommunications, 2005.

* cited by examiner

*Primary Examiner*—Sam Bhattacharya
(74) *Attorney, Agent, or Firm*—Lee, Dong, Degerman, Kang & Waimey

(57) ABSTRACT

A method of performing handover with at least one homogeneous and heterogeneous network is disclosed. More specifically, the method includes mobile station (MS) which establishes a heterogeneous network handover module for converging information from the at least one network interface module associated with the at least one of a homogeneous and heterogeneous network into a unified presentation; transmits to the heterogeneous network handover module of a serving network a handover request message to initiate handover from a serving network to a target network, wherein the handover request message is configured by the heterogeneous network handover module of a mobile station (MS); receives a handover confirmation message in response to the handover request message from the heterogeneous network handover module of the serving network; transmits a handover commit request message to the heterogeneous network handover module of a serving network, wherein the handover commit request message includes at least one target network information and includes the request to retain resources of the MS; and receives a handover commit confirmation message from the heterogeneous network handover module of the serving network, wherein the handover commit confirmation message includes a response to the request to retain resources of the MS.

22 Claims, 11 Drawing Sheets

US 7,710,924 B2

METHOD OF SUPPORTING MEDIA INDEPENDENT HANDOVER WITH RESOURCE MANAGEMENT FUNCTION IN A MOBILE COMMUNICATION SYSTEM

This application claims the benefit of Korean Application No. 10-2005-0060186, filed on Jul. 5, 2005, which is hereby incorporated by reference as if fully set forth herein.

BACKGROUND OF THE INVENTION

1. Field of the Invention

The present invention relates to a method of supporting media independent handover, and more particularly, to a method of supporting media independent handover with a resource management function in a mobile communication system.

2. Discussion of the Related Art

IEEE802.21 is in the International standardization stage for media independent handover (MIH) between heterogeneous networks, and is to provide seamless handover and service continuity between heterogeneous networks in order to improve a user's convenience for a mobile terminal. The IEEE802.21 defines basic requirements such as an MIH function, an event service (ES), a command service (CS), and an information service (IS). The mobile terminal can also be referred to as a mobile station, a terminal, a mobile subscriber station, and a like. Further, a base station can also be referred to as a node, point of attachment, a network, a base terminal, and a like.

The mobile terminal is a multimode node that supports one or more interface types, wherein the interface may be one of the following types:

Wire-line type such as 802.3 based Ethernet;
IEEE802.XX based wireless interface;
802.11
802.15
802.16
Interface prescribed by a cellular standardization mechanism such as 3GPP and 3GPP2.

As shown in FIG. 1, a multimode mobile terminal has a media access control layer and a physical layer of each mode, and an MIH function is a logic entity and can freely be arranged while implementing interface through each layer and a service access point (SAP) within a protocol stack.

Media independent handover (MIH) should be defined between 802 based interfaces or between the 802 based interfaces and non-802 based interfaces 3GPP and 3GPP2 mentioned above. A mobility management protocol of an upper layer such as a mobile IP and a session initiation protocol (SIP) should be supported for handover and a seamless service.

Hereinafter, a related art handover between heterogeneous networks will be described.

First, the MIH function will be described. The IEEE802.21 standard is to assist various handover methods to be easily operated, wherein the handover methods can be classified into break before make and make before break. The media independent handover function (MIHF) provides an asymmetric service such as a media independent event service (MIES) and a symmetric service such as a media independent command service (MICS) to upper layers and lower layers through a service access point (SAP). The MIH technique includes three MIHF services and a media independent handover protocol. The three MIHF services include a media independent event service (MIES), a media independent command service (MICS), and a media independent information service (MIIS).

Hereinafter, the event services will be described. The media independent event service is information forwarded from a link layer to upper layers, wherein the upper layers can receive the information through a registration procedure. In this case, in order to assist handover by predicting handover, the upper layers including the mobility management protocol are required to receive link layer information as to that handover will occur soon or handover has been just implemented. The media independent event service can be classified into a link event terminating at the MIHF from an entity that has generated an event in lower layers (second layer and below) and an MIH event forwarded to upper layers (third layer and above) registered by the MIHF. The link event and the MIH event can be classified into two types depending on areas to which they are forwarded. If the events are generated from an event source within a local stack and forwarded from the event source to a local MIHF or from the MIHF to the upper layers, they are referred to as local events. If the events are generated from a remote event source and forwarded from the remote event source to a remote MIHF and then from the remote MIHF to the local MIHF, these events are referred to as remote events.

FIG. 2 illustrates a structure of a local event model and an MIH event model. The MIH events are forwarded from the MIH to a higher management entity or an upper layer, and correspond to event triggers of the related art. The link event is forwarded from the lower layer (MAC or physical layer) to the MIH, and primitives are used as the link event, wherein the primitives are used in each interface MAC or physical layer.

FIG. 3 illustrates a structure of a remote link event model. If an event is generated from a lower layer in a local stack to the MIH in the same local stack, the MIH forwards the event to the MIH of a remote stack. Also, the event may be generated from the lower layer of the remote stack to the MIH of the remote stack, whereby the MIH of the local stack may receive a trigger.

FIG. 4 illustrates a structure of a remote MIH event model. Referring to FIG. 4, the MIH in the local stack generates a remote MIH event and forwards the generated remote MIH event to the other MIH in the remote stack. The other MIH forwards the remote MIH event to an upper management entity or an upper layer in its stack. Also, the event may be generated from the MIH in the remote stack to the MIH in the local stack, whereby the upper layer of the local stack may receive a trigger.

Hereinafter, the command service will be described. The media independent command service corresponds to commands sent from the upper layers (third layer and above) to the lower layers (second layer and below) to allow the upper layers and other MIH users to determine the link status and adjust an optimized operation of a multimode device. Similarly to the media independent event services, the media independent command service is classified into a link command and an MIH command. The link command and the MIH command are classified into a local command and a remote command depending on areas to which they are forwarded. A local MIH command is generated from the upper layers and then forwarded to the MIHF (for example, from the mobility management protocol of the upper layer to the MIHF or from a policy engine to the MIHF). Local link command languages are generated from the MIHF to adjust lower layer entities and then forwarded to the lower layers (for example, from the MIHF to the media access control layer or from the MIHF to the physical layer). A remote MIH command is generated from the upper layers and forwarded to a remote peer stack, and a remote link command is generated from the MIHF and transmitted to the lower layers of the remote peer stack.

FIG. 5 illustrates a structure of an MIH command model and a link command model. The MIH command is generated from the upper management entity or the upper layer and then forwarded to the MIH, and is to command the MIH to take some action. The link command is generated from the MIH and then forwarded to the lower layer, and is to command the lower layer to take some action.

FIG. 6 illustrates a structure of a remote MIH command model. The remote MIH command is generated from the upper management entity or the upper layer in the local stack and then forwarded to the MIH. The MIH forwards the remote MIH command to the other MIH in the remote stack. Also, the remote MIH command may be generated from the upper layer of the remote stack to the MIH of the remote stack, whereby the MIH of the local stack may receive the command.

FIG. 7 illustrates a structure of a remote link command model. The MIH in the local stack generates the remote link command and forwards the generated command to the other MIH in the remote stack. The other MIH forwards the command to the lower layer in the remote stack. Also, the command may be generated from the MIH in the remote stack to the MIH in the local stack, whereby the lower layer of the local stack may receive the command.

Hereinafter, the information service will be described. The media independent information service is for homogeneous or heterogeneous networks in a local area. The MIHF of the networks as well as the MIHF of the mobile terminal can detect and acquire the media independent information service. The media independent information service includes various kinds of information elements required to determine intelligent handover.

The aforementioned related media independent handover has the following problems.

In the related art, the procedure of handover from an old point of attachment to a new point of attachment is defined for the media independent handover. However, a problem occurs in that it takes a long time to resume communication when new communication is resumed due to failure of handover for the new point of attachment, or when the link with the old point of attachment is preferred as a signal with the old point of attachment is desirably resumed within a short time after handover from the boundary between two points of attachments to a new point of attachment is determined and the link with the new point of attachment is set up. Another problem occurs in that the multimode mobile terminal fails to implement a proper operation of data forwarded thereto after handover as data buffering from the old point of attachment to the new point of attachment is not forwarded to the mobile terminal.

SUMMARY OF THE INVENTION

Accordingly, the present invention is directed to a method of supporting media independent handover (MIH) with a resource management function in a mobile communication system, which substantially obviates one or more problems due to limitations and disadvantages of the related art.

An object of the present invention is to provide a method of performing handover with at least one homogeneous and heterogeneous network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of performing handover with at least one homogeneous and heterogeneous network includes a mobile station (MS) which establishes a heterogeneous network handover module for converging information from the at least one network interface module associated with the at least one of a homogeneous and heterogeneous network into a unified presentation; transmits to the heterogeneous network handover module of a serving network a handover request message to initiate handover from a serving network to a target network, wherein the handover request message is configured by the heterogeneous network handover module of a mobile station (MS); receives a handover confirmation message in response to the handover request message from the heterogeneous network handover module of the serving network; transmits a handover commit request message to the heterogeneous network handover module of a serving network, wherein the handover commit request message includes at least one target network information and includes the request to retain resources of the MS; and receives a handover commit confirmation message from the heterogeneous network handover module of the serving network, wherein the handover commit confirmation message includes a response to the request to retain resources of the MS.

In another embodiment of the present invention, a method of performing handover with at least one homogeneous and heterogeneous network includes a base station (BS) which establishes a heterogeneous network handover module for converging information from the at least one network interface module associated with the at least one of a homogeneous and heterogeneous network into a unified presentation; receives from the heterogeneous network handover module of a mobile station (MS) a handover request message to initiate handover from a serving network to a target network, wherein the handover request message is configured by the heterogeneous network handover module of the MS; transmits a handover confirmation message in response to the handover request message to the heterogeneous network handover module of the MS; receives a handover commit request message from the heterogeneous network handover module of the MS, wherein the handover commit request message includes at least one target network information and includes the request to retain resources of the MS; and transmits a handover commit confirmation message to the heterogeneous network handover module of the MS, wherein the handover commit confirmation message includes a response to the request to retain resources of the MS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
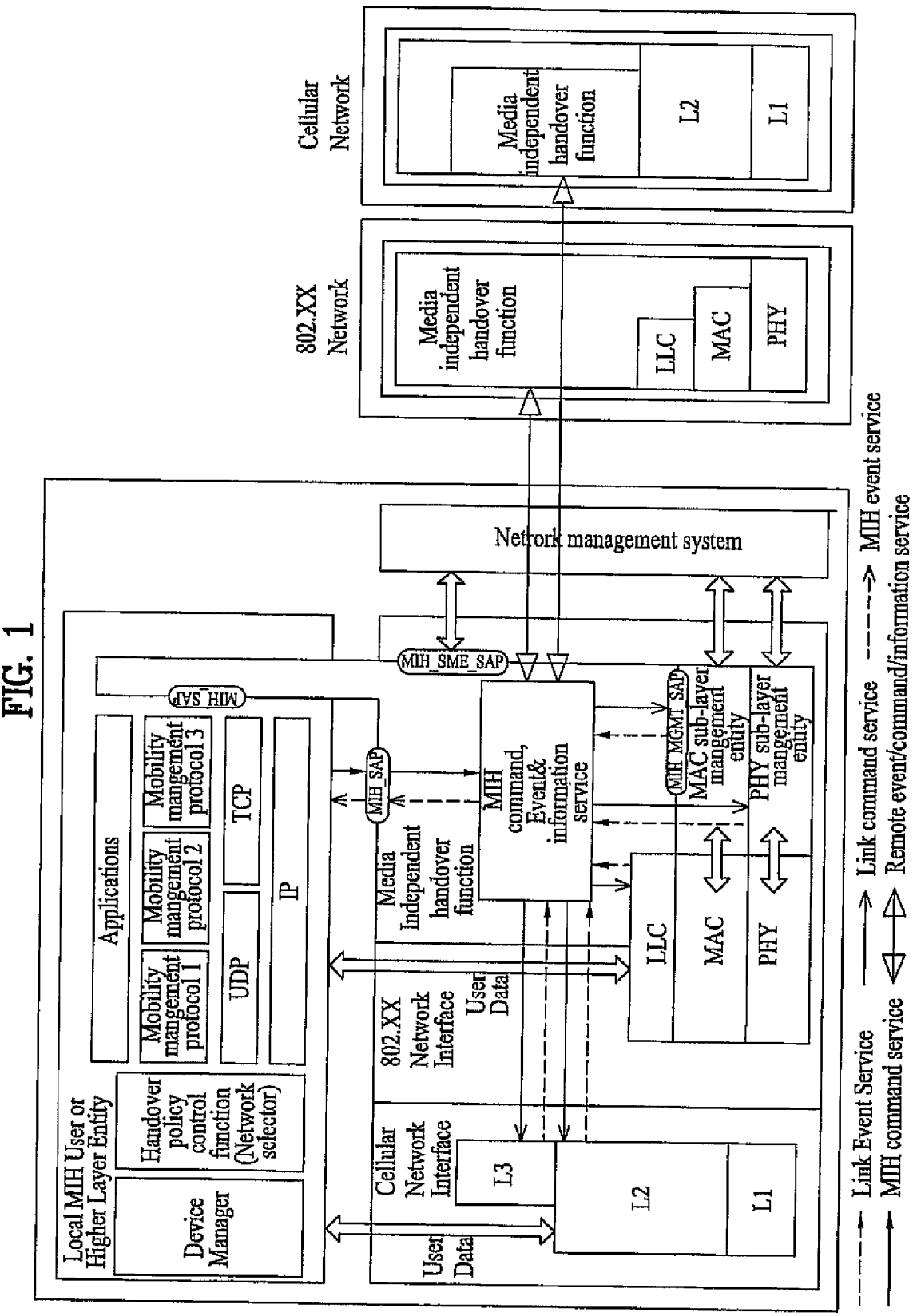
FIG. 1 illustrates a multimode mobile terminal.
Figure 2:
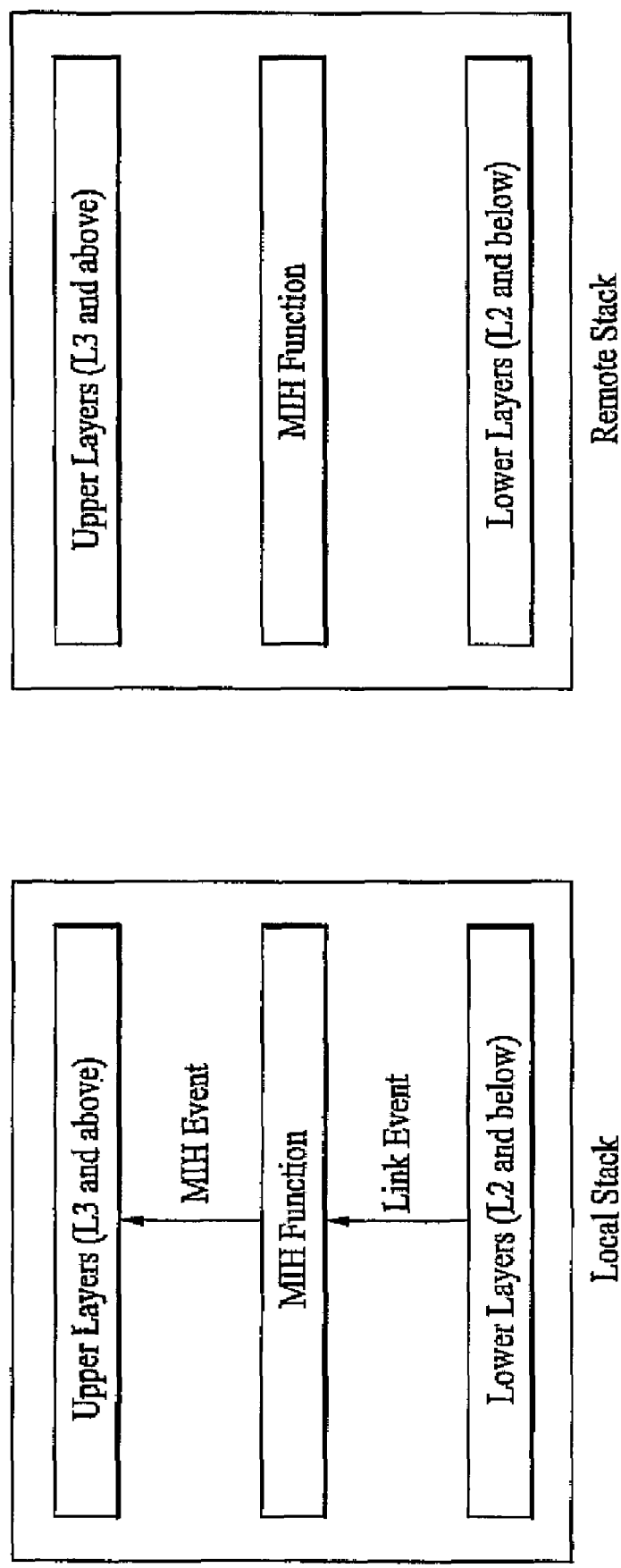
FIG. 2 illustrates a structure of a local event model and an MIH event model.
Figure 3:
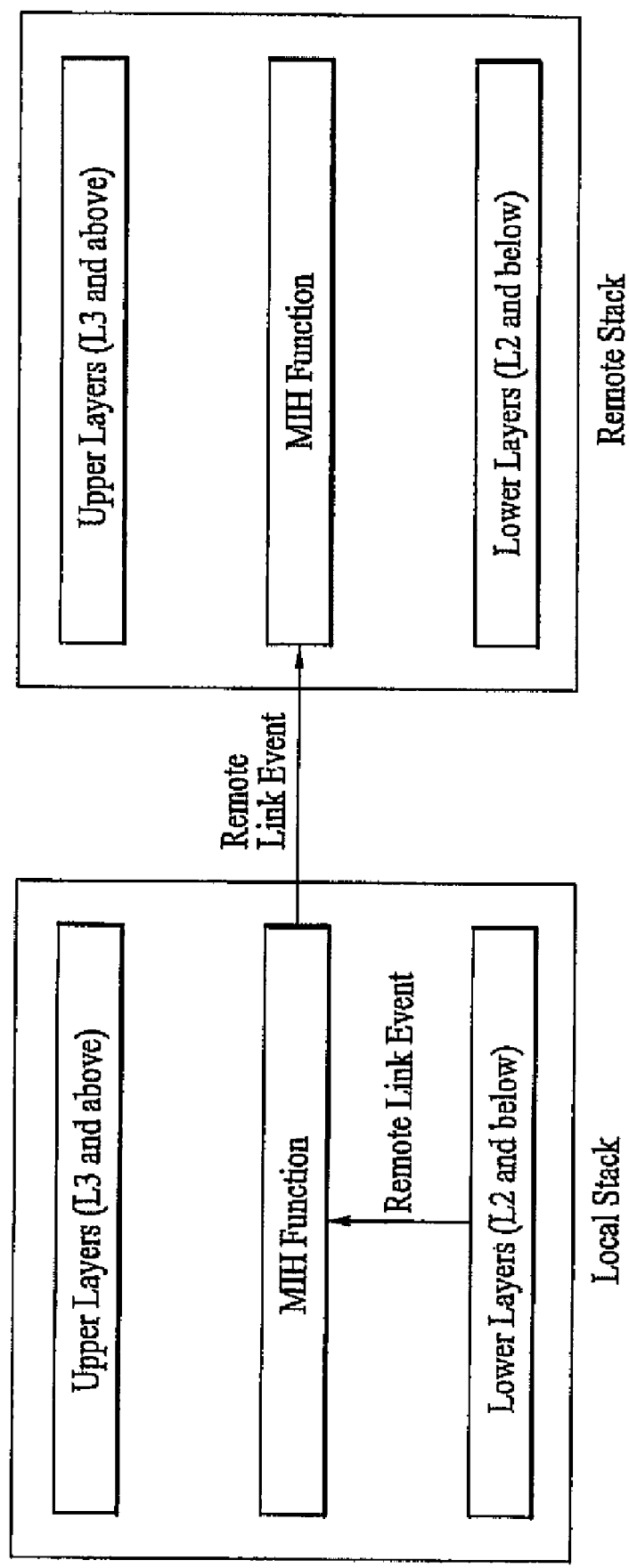
FIG. 3 illustrates a structure of a remote link event model.
Figure 4:
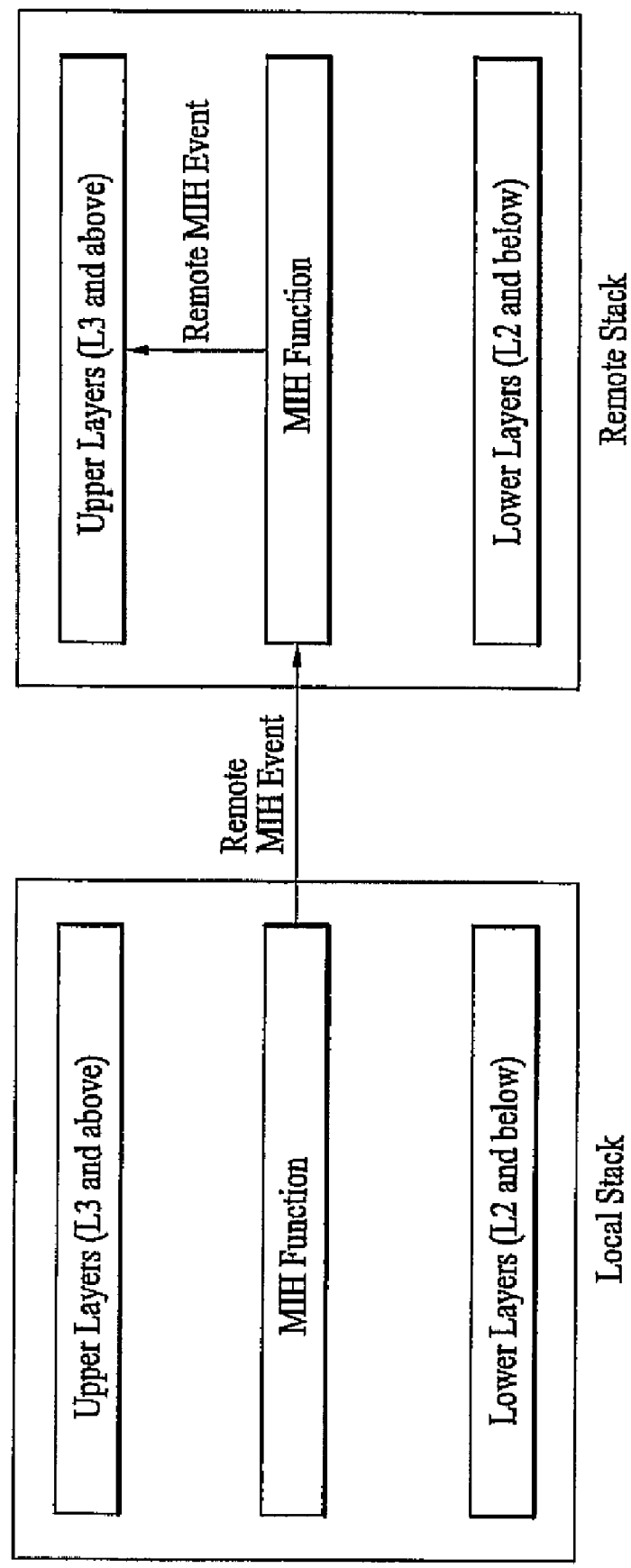
FIG. 4 illustrates a structure of a remote MIH event model.
Figure 5:
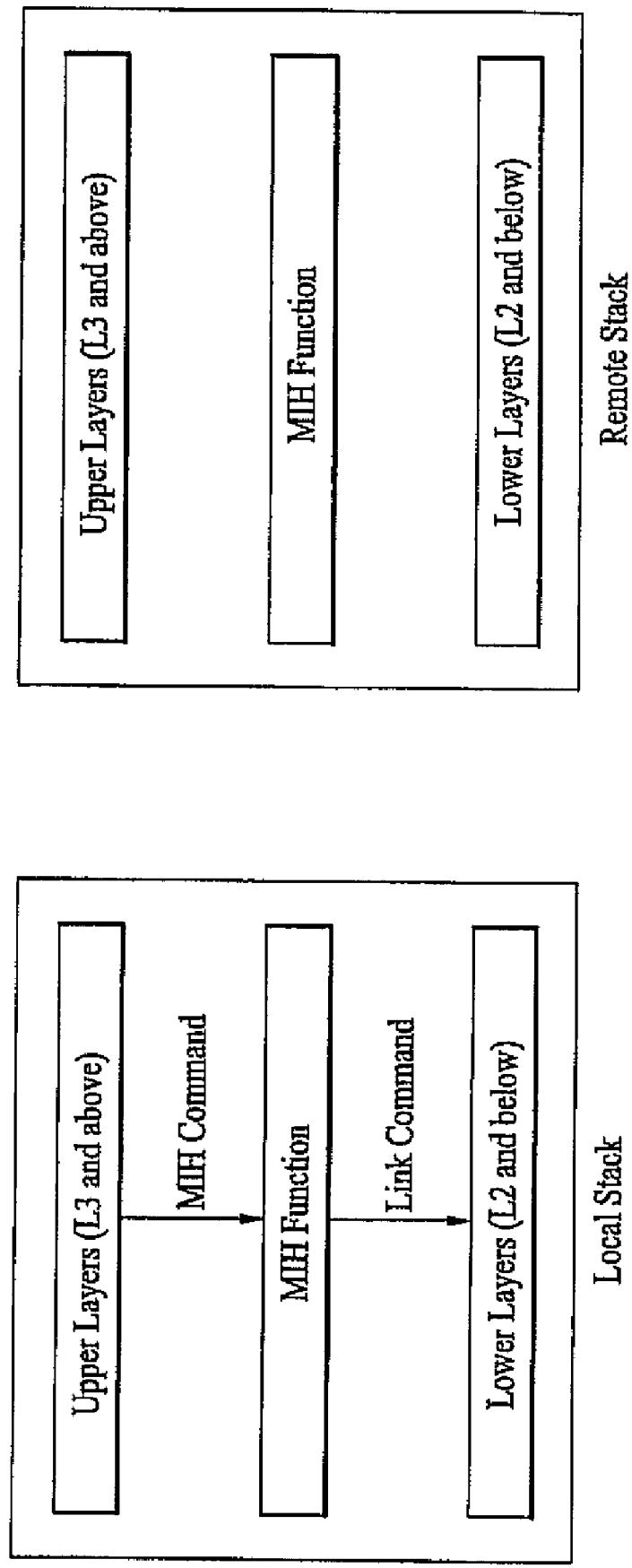
FIG. 5 illustrates a structure of an MIH command model and a link command model.
Figure 6:
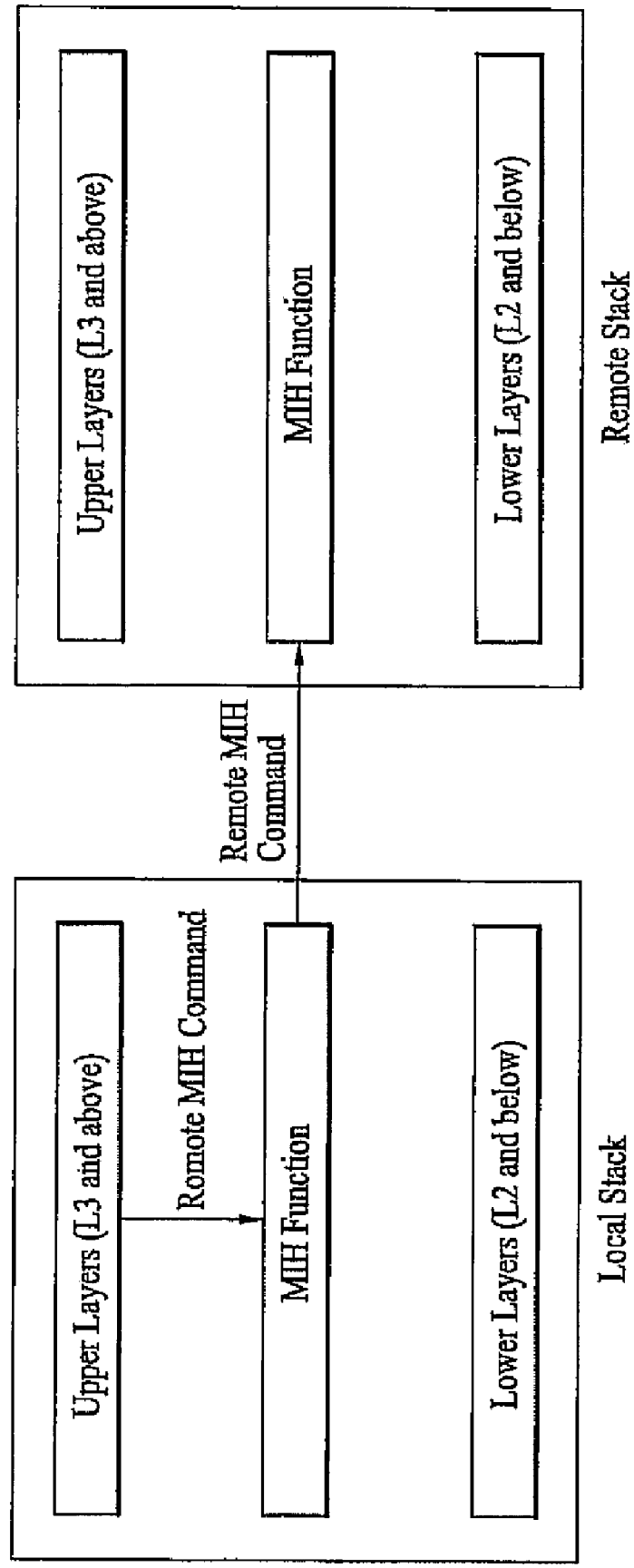
FIG. 6 illustrates a remote MIH command model.
Figure 7:
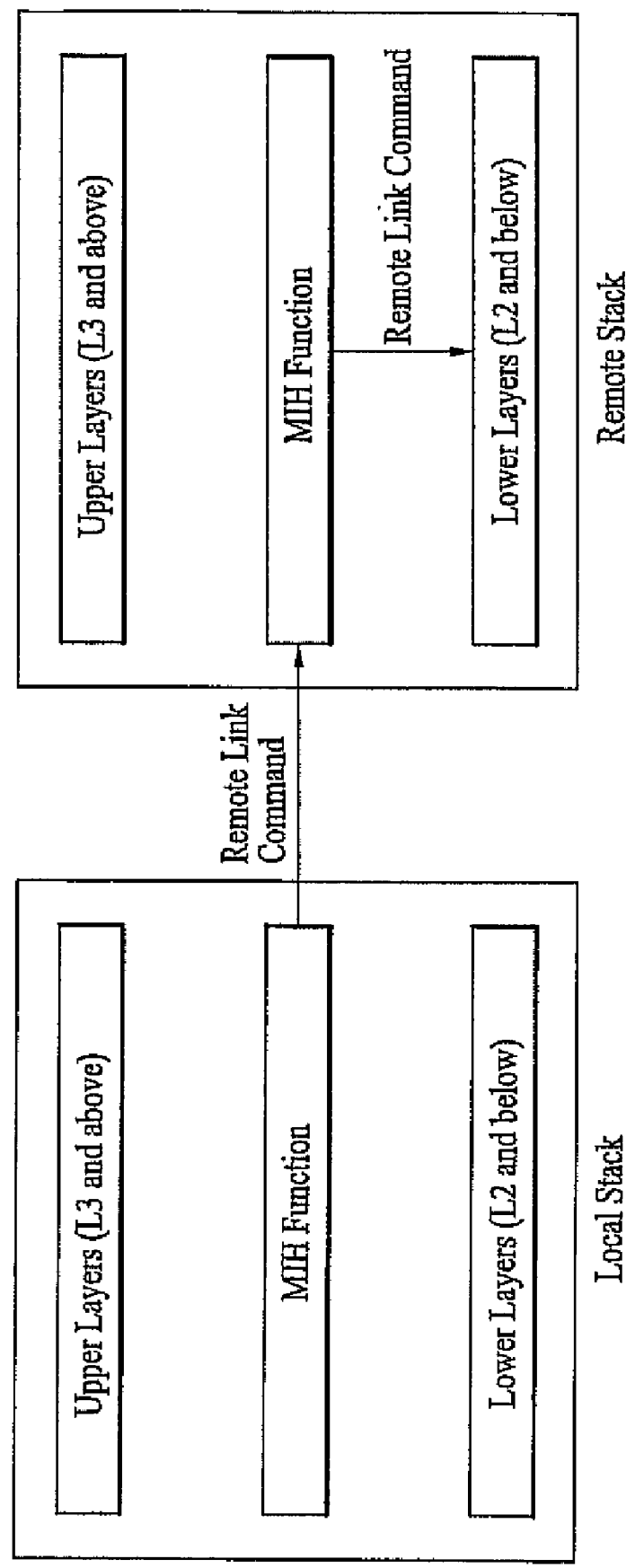
FIG. 7 illustrates a remote link command model.

Reference will now be made in detail to the preferred embodiments of the present invention, examples of which are illustrated in the accompanying drawings. Wherever possible, the same reference numbers will be used throughout the drawings to refer to the same or like parts.

Following messages are additionally provided or newly suggested for the present invention, and are expressed as primitive types.

Link_Up.indication (See Table 1) is a notification forwarded to upper layers when a third layer mobility management protocol and another upper layers can transmit upper layer packets as a second layer link is completely set up in a specified interface. All operations or procedures relating to the second layer for the link setup are needed to be completed at the time when the notification is forwarded.

However, in the present invention, if a mobile terminal fails to set up a link of a new interface, the reason why the mobile terminal failed to set up the link of the new interface is specified in the notification Link_Up.indication, so that a management entity in an upper level can take an exact operation according to the failure in setting up the link. Accordingly, a newly added result parameter can additionally be transmitted at the time when the reason why the mobile terminal failed to set up the link of the new interface is definitely recognized even in a state that the link is not completely set up. In addition, a confidence level parameter can additionally be provided, which means link quality at the time when a current link is set up and serves to notify in what probability level the current link would be maintained.

TABLE 1

| Name | Type | Description |
|---|---|---|
| EventSource | LINK_EVENT_SOURCE | The origination point from where the event is generated. |
| MacMobileTerminal | MAC Address | MAC Address of Mobile Terminal |
| LinkIdentifer | Media Specific | Unique link identifier that can be used to detect changes in network PoA. (SSID+BSSID) serves as unique network identifier for 802.11 networks |
| MacNewPoA | MAC Address | MAC Address of New PoA (AP/BS) |
| MacOldAccessRouter | MAC Address (Optional) | MAC Address of old Access Router (if any) |
| MacNewAccessRouter | MAC Address (Optional) | MAC Address of new Access Router (if any) |
| IP_Renewal_Indicator | Flag | Indicates whether the MS shall change IP Address in the new PoA<br>0: Change required<br>1: Change Not required |
| Mobility Management Protocol Support Type bitmap | BITMAP | Indicates the type of Mobility Management Protocol supported by eh new PoA<br>0: Mobile IPv4 with FA (FA-CoA)<br>1: Mobile IPv4 without FA (Co-locatedCoA)<br>2: Mobile IPv6<br>3: Mobile IPv6 with DHCPv6<br>4: SIP |
| Result | Bitmap | Indicates the result of Link setup process<br>0: Success<br>1: Authentication Fail<br>2: Link setup timeout<br>3-7: Reserved |
| Confidence Level | Percentage (0-100) | The confidence level for link to keep up at time of link up |

The result parameter may be included in another message. It will be apparent to those skilled in the art that the same advantage as that of the present invention can be obtained if the result parameter is included in another new message and transmitted at the time when the link setup is definitely failed.

MIH_End_of$_{13}$ Forwarding.Indication (See Table 2): this primitive is used to notify that an old point of attachment (source that forwards data to achieve service continuity of the mobile terminal) has forwarded all the data stored with respect to the mobile terminal to a new point of attachment. Also, this primitive may be used to allow the new point of attachment to notify the mobile terminal that data forwarding has been completed.

TABLE 2

| Name | Type | Description |
|---|---|---|
| Event Source | LINK_EVENT_SOURCE | The origination point from where the event is generated |
| MacMobileTerminal | MAC Address | MAC Address of Mobile Terminal |

MIH_Handover_Initiate.request (See Table 3): this primitive is used for communication with an MIH function in a network through an MIH function in the mobile terminal. This primitive is used to forward an intention to initiate handover. Also, this primitive may be used for communication between the network and the mobile terminal so that the network can initiate handover. In the present invention, parameters LINK_Resource_Retain and Resource retain time are added to a parameter CurrentLinkAction. The message having the added parameters is used when the mobile terminal initiates handover to transmit them, and is also used to notify that the network can retain the resource at some level if these parameters are included in handover initiated by the network. The parameters relating to resource management are included in the message so that the message may remotely be transmitted to an entity (for example, an upper management entity or a link layer) that locally manages the resource of the mobile terminal. In this case, the message serves to request a resource management entity of a point of attachment to execute a resource management request requested by the mobile terminal. If the MIH function serves as the resource management entity, the message forwarded remotely not locally is terminated in the MIH function and thus is not transmitted to another entity any longer. The message including the parameters relating to the resource management request may be initiated by the mobile terminal or the upper management entity of the network. If the MIH function executes the function of the upper management entity, the message may be initiated by the MIH function.

TABLE 3

| Name | Type | Valid Range | Description |
|---|---|---|---|
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can be either local or remote MIH Function. |
| CurrentLinkIdentifier | NetworkIdentifier. Can be one of different 802 and Cellular networks. | | This identifies the current access network over which the command needs to be sent. This is valid only for remote commands which need to be sent to remote MIHF. The command is then sent either at L2 or L3. |
| TransportLayer | TRANSPORT_L2, TRANSPORT_L3 | | This identifies the transport layer L2 or L3 over which the command needs to be sent to remote MIHF entity. This is valid only for remote commands. |
| SuggestedNewLinkIdentifier | NetworkIdentifier. Can be one of different 802 and Cellular networks | | This is the identifier of new network to which handover needs to be initiated. |
| SuggestedNewPoAIdentifier | MAC_ADDRESS (Optional) | | This is the preferred Point of Attachment (AP/BS) of new network |
| HandoverMode | Make-before_Break Break-before-Make | | The handover mode may influence the manner in which links are prepared for handover |
| CurrentLinkAction | Bitmap | | Specifies suggested action on old link once handover procedures have been executed, 0: LINK_DISCONNECT 1: LINK_LOW_POWER 2: LINK_POWER_DOWN 3: LINK_NO_ACTION 4: LINK_RESOURCE_RETAIN 5-7: Reserved |

TABLE 3-continued

| Name | Type | Valid Range | Description |
| --- | --- | --- | --- |
| ResourceRetainTime | Time in msecs | | Time interval in which the resource is retained. The mobile terminal can resume communication within this time without new link establishment procedure. |

MIH_Handover_Initiate.response (See Table 4): this primitive is used to allow a peer MIH function to communicate with an MIH function that has transmitted MIH_Handover_Initiate.request. This response message may be sent from a client or the network depending on a party that initiates the request. In the present invention, a parameter ResourceRetainTime is added to this response message, wherein the parameter indicates how long it takes to retain the resource. If this message is forwarded for the request of the mobile terminal, ResourceRetainTime is a negotiated value that can be retained by the point of attachment for the time requested from the mobile terminal, and is set as a value requested from the terminal or a value preferred by a base station.

If the message including the parameter ResourceRetainTime is locally forwarded to the MIH function, the resource management entity notifies the MIH function of the time that can retain the resource. To this end, the message can be forwarded to the MIH function of the party that has executed the resource management request through a wireless section. Additionally, the resource management fact included in the message can locally be forwarded to the upper management entity (corresponding to the party that has received the above message) that manages handover.

TABLE 4

| Name | Type | Valid Range | Description |
| --- | --- | --- | --- |
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can be either local or remote MIH Function. |
| CurrentLinkIdentifier | NetworkIdentifier. Can be one of different 802 and Cellular networks. | | This identifies the current access network over which the command needs to be sent. This is valid only for remote commands which need to be sent to remote MIHF. The command is then sent either at L2 or L3. |
| TransportLayer | TRANSPORT_L2, TRANSPORT_L3 | | This identifies the transport layer L2 or L3 over which the command needs to be sent to remote MIHF entity. This is valid only for remote commands. |
| HandoverAck | BOOL | 0 or 1 | 1: Initiate Handover 0: Abort Handover If the handover has to be aborted then a reason code is provided |
| PreferredLinkIdentifier | NetworkIdentifier. Can be one of different 802 and Cellular networks | | This is the identifier of new network to which handover needs to be initiated. This may be different than the network that was suggested in the handover request. |
| PreferredPoAIdentifier | MAC_ADDRESS | | This is the preferred Point of Attachment (AP/BS) of new network. This may be different than what was suggested in handover request. |
| AbortReason | | | Lists the reason for aborting/declining the handover request. |
| ResourceRetainTime | Time in msecs | | Time interval in which the resource is retained. The mobile terminal can resume communication within this time without new link establishment procedure. |

MIH_Handover_Complete.request (See Table 5): this primitive is used to allow an MIH function of a new point of attachment to communicate with an MIH function of an old point of attachment. This primitive is additionally provided with a result parameter and a confidence parameter. This primitive can be used to transmit the implemented result of handover. The old point of attachment that has received the message initiates packet forwarding for packets received and retained by the old point of attachment. Also, in case of successful link up (if the result is successful), if the mobile terminal transmitted by the link up is set up along with a current link, the message can be transmitted along with the current link status, i.e., a confidence level. In this case, the message may provide a basis for determining whether to release the resource retained by the old point of attachment or retain the resource for a resource retain time.

MIH_Handover_Complete.response (See Table 6): this primitive is a response to MIH_Handover_Complete.request transmitted by the new point of attachment. MIH_Handover_Complete.response according to the present invention is transmitted along with the processing result of handover if the resource of the mobile terminal is retained in the old point of attachment. In other words, if handover has successfully been implemented and the link status with a new link, i.e., the confidence level is high, the result that the resource has been released can be transmitted. If handover has successfully been implemented but the confidence level is not high, the result, which the resource would be retained for a time originally negotiated with the mobile terminal, can be transmitted.

TABLE 5

| Name | Type | Valid Range | Description |
|---|---|---|---|
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can he either local or remote MIH Function. |
| CurrentLinkIdentifier | NetworkIdentifier. Can be one of different 802 and Cellular networks. | | This identifies the current access network over which the command needs to be sent. This is valid only for remote commands which need to be sent to remote MIHF. The command is then sent either at L2 or L3. |
| TransportLayer | TRANSPORT_L2, TRANSPORT_L3 | | This identifies the transport layer L2 or L3 over which the command needs to be sent to remote MIHF entity. This is valid only for remote commands. |
| Result | Bitmap | | Indicates the result of Link setup process<br>0: Success<br>1: Authentication Fail<br>2: Link setup timeout<br>3-7: Reserved |
| Confidence Level | Percentage (0-100) | | The confidence level for link to keep up at time of link up |

TABLE 6

| Name | Type | Valid Range | Description |
|---|---|---|---|
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can be either local or remote MIH Function. |
| CurrentLinkIdentifier | NetworkIdentifier. Can be one of different 802 and | | This identifies the current access network over which the command needs to be sent. This is valid only |

TABLE 6-continued

| Name | Type | Valid Range | Description |
|---|---|---|---|
| | Cellular networks. | | for remote commands which need to be sent to remote MIHF. The command is then sent either at L2 or L3. |
| TransportLayer | TRANSPORT_L2, TRANSPORT_L3 | | This identifies the transport layer L2 or L3 over which the command needs to be sent to remote MIHF entity. This is valid only for remote commands. |
| Result | Bitmap | | Indicates the result of Link setup process<br>0: Resource is released due to successful handover<br>1: Resource will be retained<br>2-7: Reserved |

MIH_Handover_Commit.request (See Table 7): this primitive is transmitted if handover is actually implemented on the basis of the selected network and the new point of attachment. This primitive can be transmitted along with a parameter (the old point of attachment that has received the message can retain the resource of the mobile terminal through this parameter) requesting the current link at a specified level after handover, a parameter requesting data being currently received (data is being received by the mobile terminal from the old point of attachment) to be transmitted to the new point of attachment and a serial number parameter of a packet finally received from the old point of attachment. If the network receives the message, it recognizes that the mobile terminal implements handover, determines whether to implement the operation requested by the mobile terminal, and transmits the determined result to the mobile terminal along with MIH_Handover_Commit.response. Two types relating to data forwarding can be requested. The one type is DATA_FORWARDING_REQUEST requesting the data being currently received to be forwarded to the new point of attachment, and the other type is BI_CASTING_REQUEST requesting the data being current received to be simultaneously forwarded to a wireless interface and the new point of attachment.

TABLE 7

| Name | Type | Valid Range | Description |
|---|---|---|---|
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can be either local or remote MIH Function. |
| MACNewPoA | MAC Address | | MAC Address of New Point of Attachment. |
| CurrentLinkAction | Bitmap | | Specifies suggested action on old link once handover procedure have been executed.<br>0: LINK_DISCONNECT<br>1: LINK_LOW_POWER<br>2: LINK_POWER_DOWN<br>3: LINK_NO_ACTION<br>4: LINK_RESOURCE_RETAIN<br>5: DATA_FORWARDING_REQUEST<br>6: BI-CASTING_REQUEST<br>7: HANDOVER_CANCEL |
| LastPacketSequence Number | Sequence Number | | Sequence number of the last packet which the mobile terminal received. |

MIH_Handover_Commit.response (See Table 8): this primitive is a response to MIH_Handover_Commit.request, and is used to allow the point of attachment to transmit the result requested by the mobile terminal. This message serves to notify the mobile terminal of action to be taken by the network through information selected by CurrentLinkAction.

TABLE 8

| Name | Type | Valid Range | Description |
|---|---|---|---|
| CommandSource | UPPER_LAYER_TYPE | N/A | The origination point from where the command is initiated. This is usually some form of upper layer such as a policy engine, or a L3 Mobility protocol, transport, application etc. |
| CommandDestination | MIH_LOCAL, MIH_REMOTE | | This specifies the command destination which can be either local or remote MIH Function. |
| CurrentLinkAction | Bitmap | | Specifies suggested action on old link once handover procedure have been executed.<br>0: LINK_DISCONNECT<br>1: LINK_LOW_POWER<br>2: LINK_POWER_DOWN<br>3: LINK_NO_ACTION<br>4: LINK_RESOURCE_RETAIN<br>5: DATA_FORWARDING_REQUEST<br>6: BI-CASTING_REQUEST<br>7: HANDOVER_CANCEL |
| ResourceRetainTime | Time in msecs | | Time interval in which the resource is retained. The mobile terminal can resume communication within this time without new link establishment procedure. |

Following messages are expressed by message formats prescribed by the MIH protocol if the above message is remotely transmitted between MIH functions of Peers.

MIH_Link_Up.indication (See Table 9) is a notification transmitted from the MIHF located in the point of attachment to the MIHF located in the network if the link of the second layer with the mobile terminal is successful. The confidence level is newly added to the above message in accordance with the present invention.

TABLE 9

| Name | Type | Length | Value |
|---|---|---|---|
| MacMobileTerminal | | Variable | MAC Address of Mobile Terminal |
| MacNewPoA | | Variable | MAC Address of New PoA (AP) |
| MacOldAccessRouter | | Variable | MAC Address of old Access Router (if any) |
| MacNewAccessRoute | | Variable | MAC Address of new Access Router |
| Confidence Level | | 1 | The confidence level for link to keep up at the time of link Expressed in percentage (0-100) |

MIH_End_of_Forwarding.indication (See Table 10) is a message transmitted from the MIHF located in the old point of attachment to the MIHF located in the new point of attachment when data forwarding to the new point of attachment is completed. Also, the message may be transmitted from the new point of attachment to the mobile terminal to notify that the data forwarding has been completed.

TABLE 10

| Name | Type | Length | Value |
|---|---|---|---|
| MacMobileTerminal | | Variable | MAC Address of Mobile Terminal |

MIH_Handover_Initiate.request (See Table 11) is a message forwarded by the MIHF of the mobile terminal for communication with a peer MIHF on the network. Such a primitive is to notify initiation of handover. Also, handover may be initiated by the client or the network.

TABLE 11

| Name | Type | Length | Description |
|---|---|---|---|
| SuggestedNewLinkIdentifier | | Variable | The identifier of new network to which handover needs to be initiated. |
| SuggestedNewPoAIdentifier | | Variable | MAC address of the preferred Point of Attachment (AP/BS) of new network |
| HandoverMode | | 1 | The handover mode may influence the manner in which links are prepared for handover<br>0: Make-Before-Break |

TABLE 11-continued

| Name | Type | Length | Description |
|---|---|---|---|
| CurrentLinkAction | | 1 | 1: Break-Before-Make<br>2-7: Reserved<br>Specifies suggested action on old link once handover procedures have been executed,<br>0: LINK_DISCONNECT<br>1: LINK_LOW_POWER<br>2: LINK_NO_ACTION<br>3: LINK_RESOURCE_RETAIN<br>4-7: Reserved |
| ResourceRetainTime | | 2 | Time interval in which the resource is retained. The mobile terminal can resume communication within this time without new link establishment procedure.<br>Unit: 1 ms |

MIH_Handover_Initiate.response (See Table 12) is a response message to MIH_Handover_Initiate.request described above.

TABLE 12

| Name | Type | Length | Description |
|---|---|---|---|
| HandoverAck | | 1 | The result to the handover request<br>0: Initiate handover<br>1: Abort Handover |
| PreferredLinkIdentifier | | Variable | The identifier of new network to which handover needs to be initiated. |
| PreferredPoAIdentifier | | Variable | MAC address of the preferred Point of Attachment (AP/BS) of new network |
| AbortReason | | 1 | Only included when HandoverAck is 1: Abort Handover |
| ResourceRetainTime | | 2 | 0:<br>1:<br>2-7: Reserved<br>This TLV shall be included when the network decides to retain the mobile terminal's resources during the time specified in this parameter.<br>Unit: 1 ms |

MIH_Handover_Commit.request (See Table 13) is a message transmitted by the MIHF if handover is actually implemented on the basis of the selected network and the new point of attachment.

TABLE 13

| Name | Type | Length | Description |
|---|---|---|---|
| MacMobileTerminal | | Variable | MAC Address of New Point of Attachment |
| CurrentLinkAction | | 1 | Specifies suggested action on old link once handover procedure have been executed. Combination of selection is possible.<br>0: LINK_DISCONNECT<br>1: LINK_LOW_POWER<br>2: LINK_POWER_DOWN<br>3: LINK_NO_ACTION<br>4: LINK_RESOURCE_RETAIN<br>5: DATA_FORWARDING_REQUEST<br>6: BI-CASTING_REQUEST<br>7: HANDOVER_CANCEL |
| LastPacketSequenceNumber | 1 | 1 | Sequence number of the last packet which the mobile terminal received. |

MIH_Handover_Commit.response (See Table 14) is a response message to MIH_Handover_Commit.request described above.

TABLE 14

| Name | Type | Valid Range | Description |
| --- | --- | --- | --- |
| CurrentLinkAction | | 1 | Specifies suggested action on old link once handover procedure have been executed. Combination of selection is possible. 0: LINK_DISCONNECT 1: LINK_LOW_POWER 2: LINK_POWER_DOWN 3: LINK_NO_ACTION 4: LINK_RESOURCE_RETAIN 5: DATA_FORWARDING_REQUEST 6: BI-CASTING_REQUEST 7: HANDOVER_CANCEL |
| ResourceRetainTime | | 2 | This TLV shall be included when the network decides to retain the mobile terminal's resources during the time specified in this parameter. Unit: 1 ms |

MIH_Handover_Complete.request (See Table 15) is a message forwarded by the MIHF of the new point of attachment for communication with the MIHF of the old point of attachment. The message is used to notify the operation status of handover. This message is also used to transmit data to be forwarded from the old point of attachment.

TABLE 15

| Name | Type | Length | Description |
| --- | --- | --- | --- |
| Result | | 1 | Indicates the result of Link setup process. 0: Success 1: Authentication Fail 2: Link setup timeout 3-7: Reserved |
| Confidence Level | | 1 | The confidence level for link to keep up at time of Link up |

MIH_Handover_Complete.response (See Table 16) is a message forwarded by the MIHF of the old point of attachment for communication with the MIHF of the new point of attachment. The message is used to notify the result of retaining resource according to the confidence level and the handoff result parameter included in MIH_Handover_Complete.request.

TABLE 16

| Name | Type | Length | Description |
| --- | --- | --- | --- |
| Result | | 1 | Indicates the result of Link setup process. 0: Resource is released due to successful Handover 1: Resource will be retained 2-7: Reserved |

A method of retaining the resource and forwarding the data during handover between heterogeneous networks using the aforementioned primitives and messages in accordance with the preferred embodiment of the present invention will be described.

In the present invention and throughout the document, the MIH can also be referred to as a heterogeneous network handover module. Further, an old point of attachment can be referred to as a serving network while a new point of attachment can be referred to as a target network. Lastly, the present invention is not limited to the heterogeneous network but can also be applied to homogeneous network as well.

Figure 8:
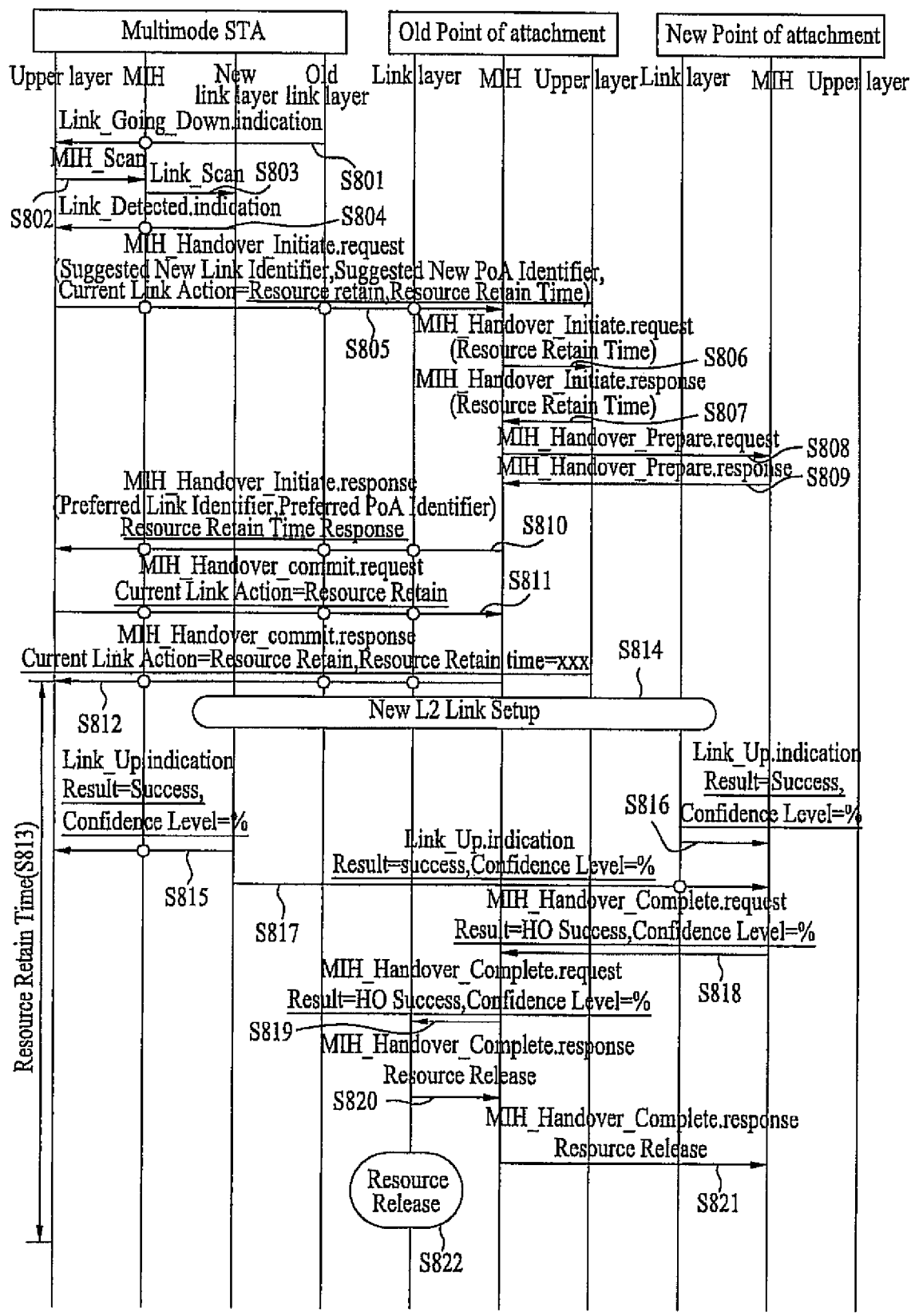
FIG. 8 is a flowchart illustrating a method of implementing handover while retaining a resource of a mobile terminal in an old point of attachment if a mobile terminal implements handover between heterogeneous networks in accordance with the preferred embodiment of the present invention.

FIG. 8 is a flowchart illustrating a method of implementing handover between heterogeneous networks while retaining the resource of the mobile terminal in the old point of attachment in accordance with the preferred embodiment of the present invention. The multimode mobile terminal is notified from the link layer that the link being currently in service will be released from the service after a specified time period (S801). The upper management entity commands scanning of another link to implement handover to another network and forwards this command to a corresponding interface link layer through the MIH (S802 and S803). The corresponding link layer implements such scanning of another link and notifies the upper management entity of the scanned link through the MIH (S804). The upper management entity notifies that handover will be remotely initiated through the MIH (S804). At this time, the upper management entity forwards a type identifier of a link for handover, an identifier of a point of attachment, an action to be taken by a current link after handover, a resource retaining request, and a resource retaining time (S805). Here, a plurality of the identifiers may be forwarded. To put differently, at this step, the upper layer entity transmits to the MIH of the old point of attachment a handover request message to initiate handover from the old point of attachment to a new point of attachment. Here, the handover request message is configured by the MIH. Thereafter, the upper management entity of the point of attachment receives the resource retaining request (S806) and transmits to the MIH its determination as to whether to retain the resource and the resource retaining time (S807).

The point of attachment, which has received a request of handover initiation, notifies the new point of attachment that the mobile terminal intends to implement handover, so that the new point of attachment can acquire a required resource (S808). Also, the new point of attachment acquires information of an available resource through query (S809). The old point of attachment transmits a response to the handover initiation requested from the mobile terminal. This response includes information of the point of attachment that can enable handover and the resource retaining time that can be retained actually by the old point of attachment (S810). The mobile terminal forwards the request of handover initiation along with the action after handover of the current link. In the embodiment of the present invention, the resource retaining request is suggested (S811). The old point of attachment finally identifies the available resource retaining time at the time when handover is implemented. If a value relating to the resource retaining time is not forwarded or is set as 0, the previously negotiated resource retaining time is used (S812). The mobile terminal that has received a confirmation message MIH_Handover_Commit.response of handover through the point of attachment can activate a timer for the resource retaining time. In addition, the point of attachment can activate the timer for the resource retaining time transmitted to the mobile terminal at the time when the confirmation message MIH_Handover_Commit.response of handover is transmitted to the mobile terminal (S813). The timer can identify the resource retaining time, and the mobile terminal can reset up the link to the old point of attachment using the retained resource within the resource retaining time. A new link with the point of attachment is set up (S814). Information as to that the new link has been set up is forwarded from the new link layer of the mobile terminal to the upper management layer through the MIH. At this time, information as to that the new link has been successfully set up and a confidence level of the setup link can also be forwarded (S815). Here, the confidence level indicates an expected probability for maintaining link connection. A new link layer of the point of attachment notifies the MIH that the new link with the mobile terminal has been set up. At this time, the confidence level measured by the link layer can also be transmitted (S816). The confidence level means link quality at the time when the current link is set up, and indicates in what probability this link will be retained. If this information is remotely forwarded to the old point of attachment, it is possible to determine whether to retain the resource of the mobile terminal, which has successfully implemented handover, for the resource retaining time, or whether to release the resource at the time when successful handover is noticed. The mobile terminal can selectively transmit the information that the link has been remotely set up (S817). Here, the information can further include the confidence level. The new point of attachment notifies the old point of attachment that handover has been completed. At this time, the new point of attachment transmits the result of handover. If the result of handover is successful, the confidence level is also transmitted (S818). The result of handover transmitted from the new point of attachment is forwarded to the link layer (S819), judgment as to whether to retain the resource is made and the result of judgment is transmitted to the MIH, wherein the judgment means information as to whether the resource is retained or released (S820). In the embodiment of the present invention, the link layer serves as the resource management entity, and if a resource retaining entity exists in the upper layer, the upper management entity can be notified of the result in the same manner as the action of the link layer. The old point of attachment transmits a response to MIH_Handover_Complete.request to the new point of attachment along with the processing result of the retaining resource (S821). The resource is released by the link layer or the upper management entity, which has been notified of the result of handover (the resource may be retained in accordance with the result of handover as described above) (S822). The resource may be released at the time when MIH_Handover_Complete.request is received and judgment is made.

Figure 9:
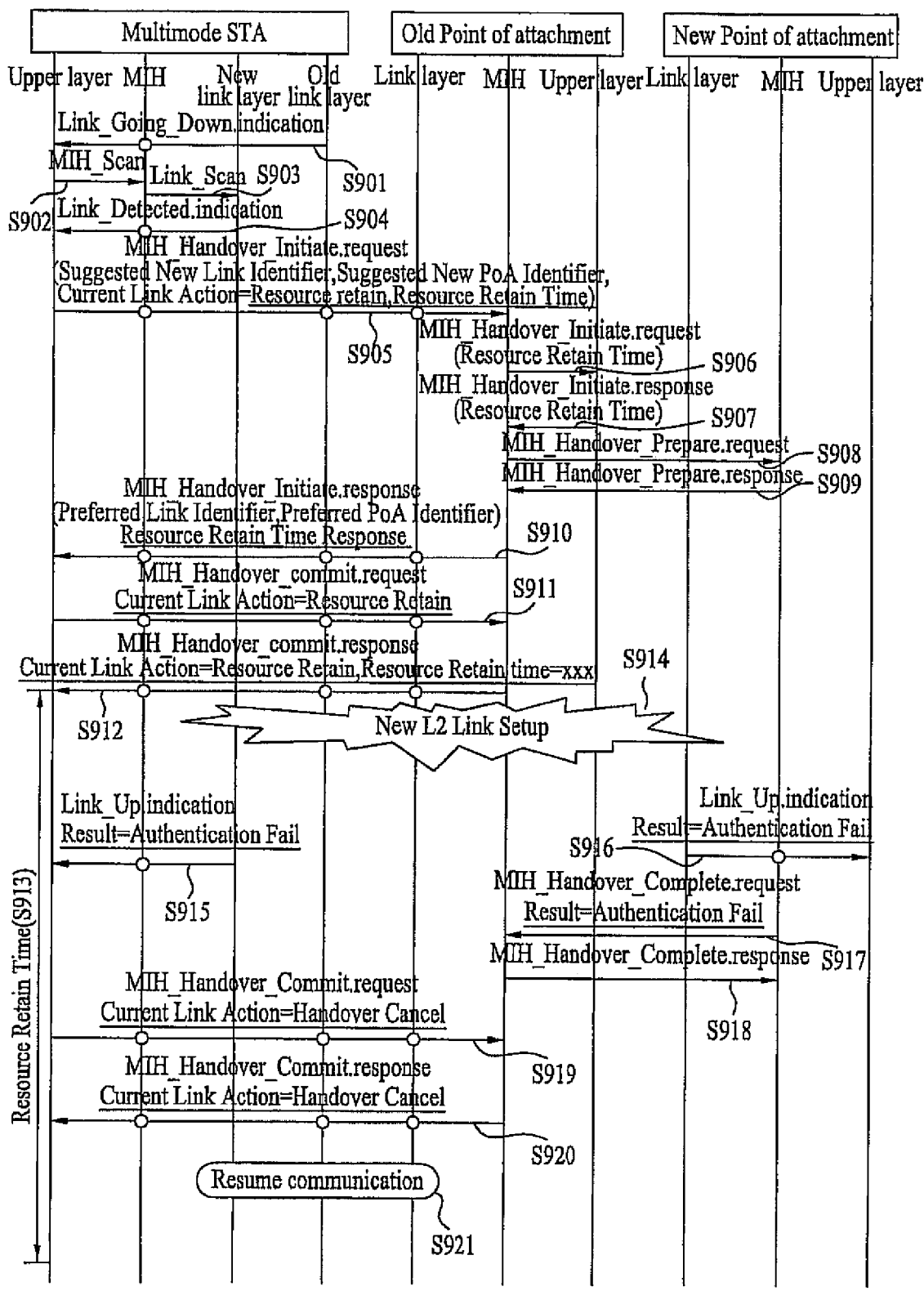
FIG. 9 is a flowchart illustrating a method of resuming communication with an old point of attachment if handover is failed, in accordance with the preferred embodiment of the present invention.

FIG. 9 is a flowchart illustrating a method of resuming communication with the old point of attachment if handover between heterogeneous networks is failed in a state that the resource of the mobile terminal is retained in the old point of attachment for a certain time.

Steps S901 to S913 are the same as the steps S801 to S813. When the multimode mobile terminal sets up the link with the new point of attachment, such link setup is failed for some reason (S914). The mobile terminal and the link layer of the new point of attachment, which detect failure of the link setup, transmit such failure and the reason of failure (authentication failure in the embodiment of the present invention) to the MIH (S915 and S916). The new point of attachment notifies the old point of attachment that handover has been failed (i.e., failure of the link setup with the new point of attachment) (S917). Notifying the old point of attachment of failure of handover allows the old point of attachment to recognize that the mobile terminal will resume communication. The old point of attachment transmits the response to MIH_Handover_Complete.request (S918).The mobile terminal sets up Current Link Action of MIH_Handover_Commit.request as Handover Cancel and transmits the setup message in order to cancel previously requested handover and request communication to be resumed (S919). The old point of attachment transmits the result of the request to cancel the previously requested handover (S920). The mobile terminal and a prior base station resume communication using the retained resource without new link setup (S921). The reason why communication can be resumed without new link setup is that the old point of attachment retains the resource of the mobile terminal for the resource retaining time.

Figure 10:
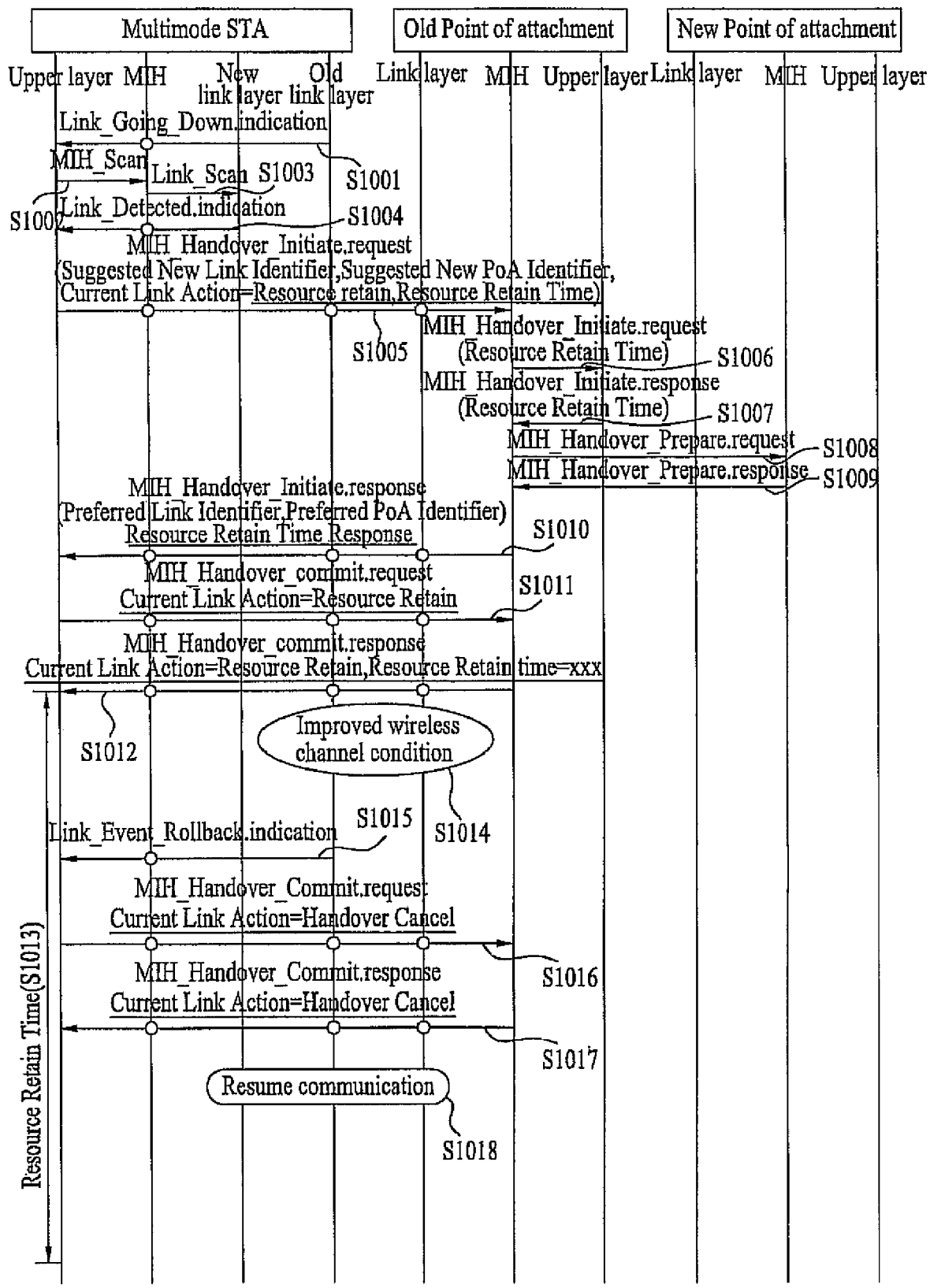
FIG. 10 is a flowchart illustrating a method of resuming communication with an old point of attachment if quality of an old link is restored when handover is implemented while a resource of a mobile terminal is retained in the old point of attachment in accordance with the preferred embodiment of the present invention.

FIG. 10 is a flowchart illustrating a method of resuming communication with the old point of attachment as quality of the old link is restored when the mobile terminal implements handover between heterogeneous networks while retaining its resource in the old point of attachment in accordance with the preferred embodiment of the present invention.

Steps S1001 to S1013 are the same as the steps S901 to S913. Wireless quality of the link, which is notified that the link will be gone down due to poor wireless quality, is improved (S1014). To cancel Link_Going_Down.indication indicating that the link will be terminated, the old link layer of the mobile terminal transmits Link_Event_Rollback.indication to the upper management entity of the mobile terminal through the MIH of the mobile terminal (S1015). The mobile terminal sets up Current Link Action of MIH_Handover_Commit.request as Handover Cancel and transmits the setup message in order to cancel previously requested handover to the new point of attachment and request communication with the old point of attachment to be resumed (S1016). The old point of attachment transmits the result of the request from the mobile terminal (S1017). Since the old point of attachment retains the resource of the mobile terminal for the resource retaining time through the steps S1001 to S1013, the mobile terminal and the prior base station can resume communication using the retained resource without new link setup (S1018).

Figure 11:
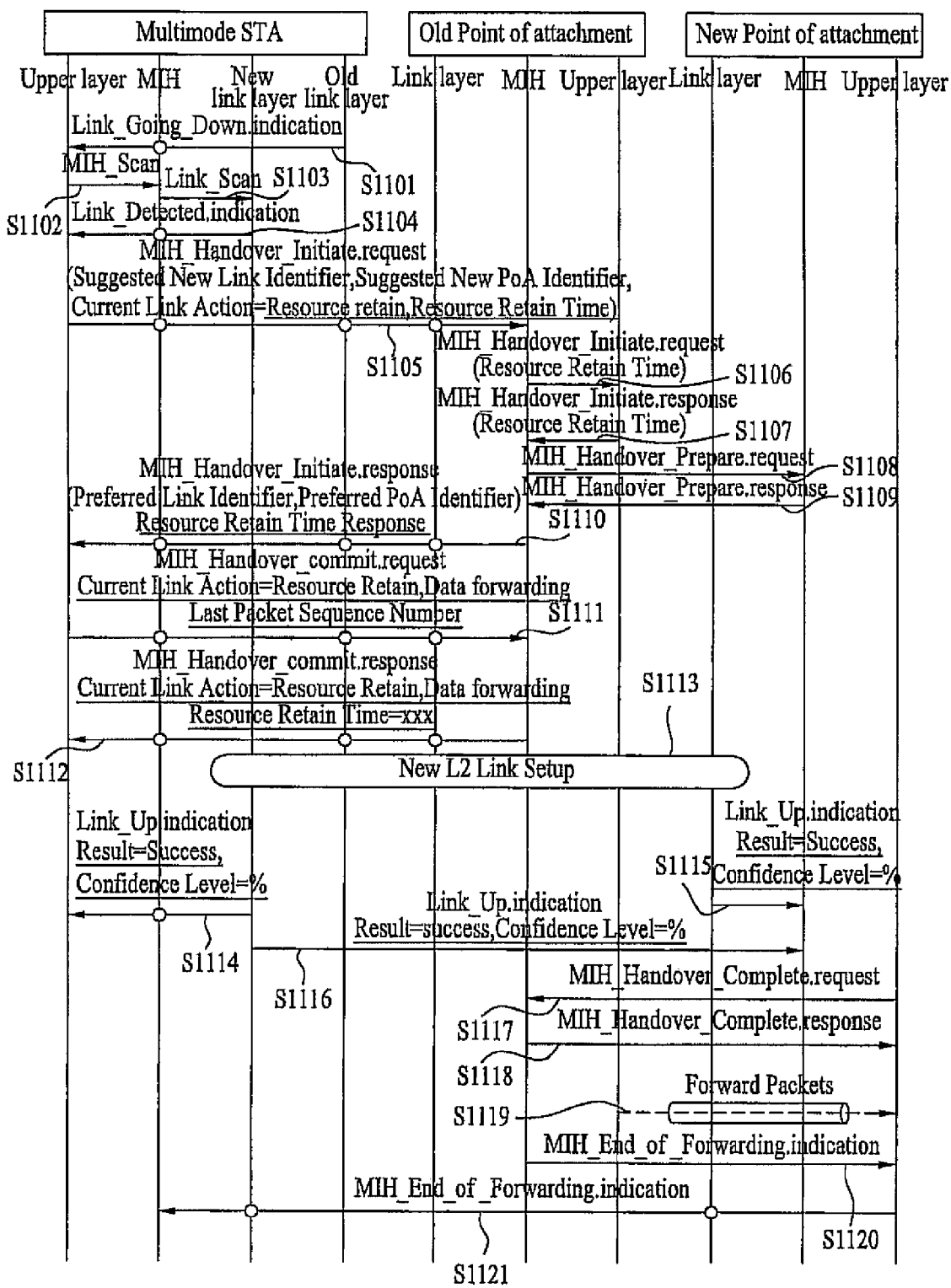
FIG. 11 is a flowchart illustrating a method of forwarding receiving data to a new point of attachment if handover is implemented while a resource of a mobile terminal is retained in an old point of attachment in accordance with the preferred embodiment of the present invention.

FIG. 11 is a flowchart illustrating a method of forwarding receiving data to the new point of attachment if the mobile terminal implements handover between heterogeneous networks while retaining its resource in the old point of attachment in accordance with the preferred embodiment of the present invention.

Steps S1101 to S1110 are the same as the steps S801 to S813. The mobile terminal forwards the request of handover initiation along with the action of the current link after handover, wherein the action means the action of the old point of attachment after link termination with the old point of attachment. In the embodiment of the present invention, the resource retaining request and a forwarding request of the currently receiving data to the new point of attachment are suggested (S1111), wherein the request can be executed because Current Link Action has been set up as Resource Retain and Data Forwarding Request, and because LastPacketSequence Number has been requested for packet forwarding. The data forwarding request includes Data_Forwarding_Request requesting forwarding of the currently receiving data to the new point of attachment and Bi_Casting_Request requesting forwarding of the data to the mobile terminal through Air Interface of the old point of attachment and to the new point of attachment. The old point of attachment sets up the action after handover, which can be implemented at the time when handover is implemented, and finally identifies the resource retaining time (S1112). The link with the new point of attachment is set up (S1113). Information as to that the new link has been set up is noticed from the new link layer of the mobile terminal to the upper management layer through the MIH (S1114). The link layer of the new point of attachment also notifies the MIH that the new link with the mobile terminal has been set up (S1115). The mobile terminal can selectively transmit information as to that the link has been remotely set up (S1116). The new point of attachment notifies the old point of attachment that handover has been completed. At this time, the new point of attachment transmits the result of handover. If the result of handover is successful, the old point of attachment receives MIH_Handover_Complete.request and identifies that packet forwarding should be initiated (S1117). The old point of attachment transmits the response to MIH_Handover_Complete.request to the new point of attachment (S1118). The old point of attachment forwards data to the new point of attachment (S1119). When packets stored in the old point of attachment are completely transmitted to the new point of attachment, the old point of attachment notifies the new point of attachment that packet forwarding has been completed (S1120). The new point of attachment remotely notifies the mobile terminal that packet forwarding has been completed (S1120). The forwarding completion message may be forwarded to the upper management entity or the link layer through the MIH if necessary.

As described above, the method of transmitting and receiving a message for media independent handover (MIH) having a resource management function of a mobile terminal according to the preferred embodiment of the present invention has the following advantages.

If the MIH is failed, or if the link with the old point of attachment is again set up due to the improved wireless condition with the old point of attachment, the method of retaining the resource through the old point of attachment is provided, whereby the mobile terminal can promptly resume communication with the old point of attachment. In addition, in case of the MIH, the method of forwarding the receiving data to the new point of attachment is provided, whereby service continuity can be maintained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of performing a media independent handover (MIH) in a MIH module of a mobile terminal, the method comprising:

transmitting a first MIH message to a serving network, wherein the first MIH message includes a first parameter indicating a first link type of a target network and first information of the target network for handover;

receiving a second MIH message in response to the first MIH message from the serving network, wherein the second MIH message includes a second parameter indicating a second link type of the target network and second information of the target network for handover;

transmitting a third MIH message to the serving network, wherein the third MIH message includes a first link action parameter related to at least one link action to be executed in a handover procedure; and receiving a fourth MIH message from the serving network, wherein the fourth MIH message includes a second link action parameter containing a result of the at least one link action, wherein the first link action parameter is set to retain a link resource for a link connection between the mobile terminal and the serving network after the link connection is disconnected.

2. The method according to claim 1, further comprising:

receiving first MIH information from an upper layer of the mobile terminal, the first MIH information including a link action list to control the MIH module, wherein the link action list is related to the at least one link action; and transmitting second MIH information to report the result of the at least one link action to the upper layer, wherein the second MIH information includes the result of the at least one link action.

3. The method according to claim 1, wherein the third MIH message is received by an MIH module of the serving network and the fourth MIH message is transmitted from the MIH module of the serving network.

4. The method according to claim 1, wherein the fourth MIH message further includes a timer parameter indicating a time interval during which the link resource is retained.

5. The method according to claim 1, wherein the first parameter and the second parameter indicate the same link type of the target network and the first information of the target network and the second information of the target network are the same information.

6. A method of supporting a media independent handover (MIH) in an MIH module of a serving network, the method comprising:

receiving a first MIH message from a mobile terminal, wherein the first MIH message includes a first parameter indicating a first link type of a target network and information of the target network for the media independent handover;

transmitting a second MIH message in response to the first MIH message to the mobile terminal, wherein the second MIH message includes a second parameter indicating a second link type of the target network and second information of the target network for handover;

receiving a third MIH message from the mobile terminal, wherein the third MIH message includes a first link action parameter related to at least one link action to be executed in a handover procedure; and transmitting a fourth MIH message to the mobile terminal, wherein the fourth MIH message includes a second link action parameter containing a result of the at least one link action, wherein the first link action parameter is set to retain a link resource for a link connection between the mobile terminal and the serving network after the link connection is disconnected.

7. The method according to claim 6, further comprising:
receiving a fifth MIH message from the target network, wherein the fifth MIH message indicates completion of the handover procedure and includes a result parameter indicating whether the handover is successful, fails, or is rejected; and
transmitting a sixth MIH message, wherein the sixth MIH message includes a resource retain result parameter in response to the fifth MIH message, the resource retain result parameter indicating whether the resource of the mobile terminal is retained or released.

8. The method according to claim 7, further comprising:
transmitting first MIH information including the result parameter to an upper layer of the serving network; and
receiving second MIH information to report the result of the at least one link action from the upper layer of the serving network, wherein the second MIH information includes the result of the at least one the link action.

9. The method according to claim 6, wherein the third MIH message is transmitted by an MIH module of the mobile terminal and the fourth MIH message is received from the MIH module of the mobile terminal.

10. The method according to claim 6, wherein the fourth MIH message further includes a timer parameter indicating a time interval during which the link resource is retained.

11. The method according to claim 6, wherein the first parameter and the second parameter indicate the same link type of the target network and the first information of the target network and the second information of the target network are the same information.

12. A mobile terminal for performing a media independent handover (MIH), the mobile terminal comprising:
a transmit module for transmitting a message related to the MIH;
a receiving module for receiving a message related to the MIH;
a MIH module for controlling an operation of the MIH; and
an upper entity for controlling an operation of an upper layer;
wherein the MIH module transmits a first MIH message including a first parameter indicating a first link type of a target network and first information of the target network for handover to the serving network, receives a second MIH message including a second parameter indicating a second link of the target network and second information of the target network for handover from the serving network in response to the first MIH message, transmits a third MIH message to the serving network including a first link action parameter related to at least one link action to be executed in a handover procedure, and receives a fourth MIH message from the serving network including a second link action parameter containing a result of the at least one link action, and
wherein the first link action parameter is set to retain a resource for a link connection between the mobile terminal and the serving network after the link connection is disconnected.

13. The mobile terminal according to claim 12, wherein the MIH module further receives first MIH information from the upper entity including a link action list to control the MIH module and transmits second MIH information to the upper entity to report the result of the at least one link action, and wherein the link action list is related to the at least one link action and the second MIH information includes the result of the at least one link action.

14. The mobile terminal according to claim 12, wherein the third MIH message is received by an MIH module of the serving network and the fourth MIH message is transmitted from the MIH module of the serving network.

15. The mobile terminal according to claim 12, wherein the fourth MIH message further includes a timer parameter indicating a time interval during which the link resource is retained.

16. The mobile terminal according to claim 12, wherein the first parameter and the second parameter indicate the same link type of the target network and the first information of the target network and the second information of the target network are the same information.

17. A serving network for supporting a media independent handover (MIH), the serving network comprising:
a transmit module for transmitting a message related to the MIH;
a receiving module for receiving a message related to the MIH;
a MIH module for controlling an operation of the MIH; and
an upper entity for controlling an operation of an upper layer;
wherein the serving network receives a first MIH message including a type parameter indicating a first link type of a target network and information of the target network for the MIH from a mobile terminal, transmits a second MIH message including a second parameter indicating a second link type of the target network and second information of the target network for handover, receives a third MIH message from the mobile terminal including a first link action parameter related to at least one link action to be executed in a handover procedure, and transmits a fourth MIH message to the mobile terminal including a second link action parameter containing a result of the at least one link action,
wherein the first link action parameter is set to retain a link resource for a link connection between the mobile terminal and the serving network after the link connection is disconnected.

18. The serving network according to claim 17,
wherein the MIH module of the serving network further receives a fifth MIH message from the target network indicating completion of the handover procedure and transmits a sixth MIH message including a resource retain result parameter in response to the fifth MIH message, and
wherein the fifth MIH message includes a result parameter indicating whether the handover is successful, fails, or is rejected and the resource retain result parameter indicates whether the resource of the mobile terminal is retained or released.

19. The serving network according to claim 18,
wherein the MIH module of the serving network further transmits first MIH information including the result parameter and receives second MIH information to report the result of the at least one link action, and
wherein the second MIH information includes the result of the at least one link action.

20. The serving network according to claim 17, wherein the third MIH message is transmitted by an MIH module of the mobile terminal and the fourth MIH message is received from the MIH module of the mobile terminal.

21. The serving network according to claim 17, wherein the fourth MIH message further includes a timer parameter indicating a time interval during which the link resource is retained.

22. The serving network according to claim 17, wherein the first parameter and the second parameter indicate the same link type of the target network and the first information of the target network and the second information of the target network are the same information.

* * * * *